United States Patent [19]
Salda

[11] Patent Number: 5,577,590
[45] Date of Patent: Nov. 26, 1996

[54] MACHINE FOR COLLECTING USED DISPOSABLE CUPS

[75] Inventor: Luciano Salda, Vignola, Italy

[73] Assignee: C.M.S. S.p.A., Marano sul Panaro, Italy

[21] Appl. No.: 321,264

[22] Filed: Oct. 11, 1994

[30] Foreign Application Priority Data

Nov. 8, 1993 [IT] Italy ................ MO93A0140

[51] Int. Cl.[6] ................ G07F 7/06; B08B 9/093
[52] U.S. Cl. ................ 194/209; 134/62; 134/63; 134/80; 134/134; 134/152
[58] Field of Search ................ 194/208, 209, 194/212, 213; 221/221, 297, 298, 96; 198/626.1; 134/62, 63, 80, 134, 152; 100/902

[56] References Cited

U.S. PATENT DOCUMENTS

| | | | |
|---|---|---|---|
| Re. 27,643 | 5/1973 | Myers | 194/208 |
| 1,666,008 | 4/1928 | Graffenberger | 221/221 |
| 3,006,455 | 10/1961 | Dudnick | 198/626.1 X |
| 3,031,745 | 5/1962 | Dzialo | 100/902 X |
| 3,302,655 | 2/1967 | Sasaki et al. | 134/134 X |
| 3,940,014 | 2/1976 | Kinney . | |
| 4,248,389 | 2/1981 | Thompson et al. . | |
| 4,784,251 | 11/1988 | Dewoolfson et al. | 194/212 X |
| 5,437,358 | 8/1995 | Schiffelholz | 194/212 |

FOREIGN PATENT DOCUMENTS

| | | | |
|---|---|---|---|
| 0082735 | 6/1983 | European Pat. Off. . | |
| 0301978 | 2/1989 | European Pat. Off. | 194/209 |
| 0442027 | 8/1991 | European Pat. Off. . | |
| 9305452 | 11/1993 | European Pat. Off. . | |
| 1212161 | 3/1960 | France . | |
| 2580418 | 10/1986 | France | 194/208 |
| 4001593 | 7/1991 | Germany . | |

*Primary Examiner*—F. J. Bartuska
*Attorney, Agent, or Firm*—Browdy and Neimark

[57] ABSTRACT

The machine comprises an identification device for accepting suitable or ejecting unsuitable used cups, which on being accepted are conveyed through an inlet mouth towards a bin, following a journey whereon are situated one or more operative groups, through which the cups pass and are treated such as to render them easier to contain.

19 Claims, 8 Drawing Sheets

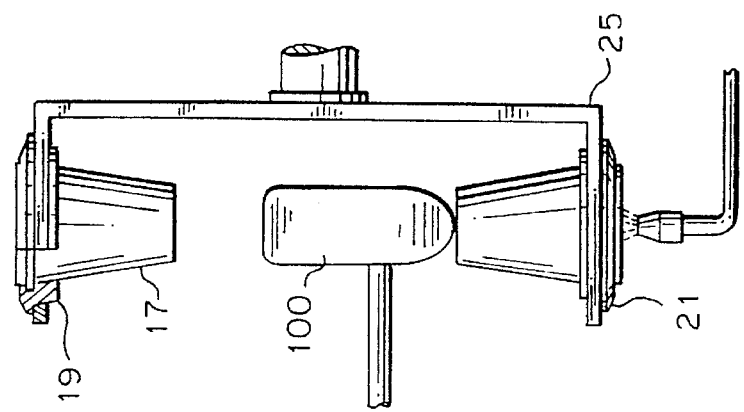
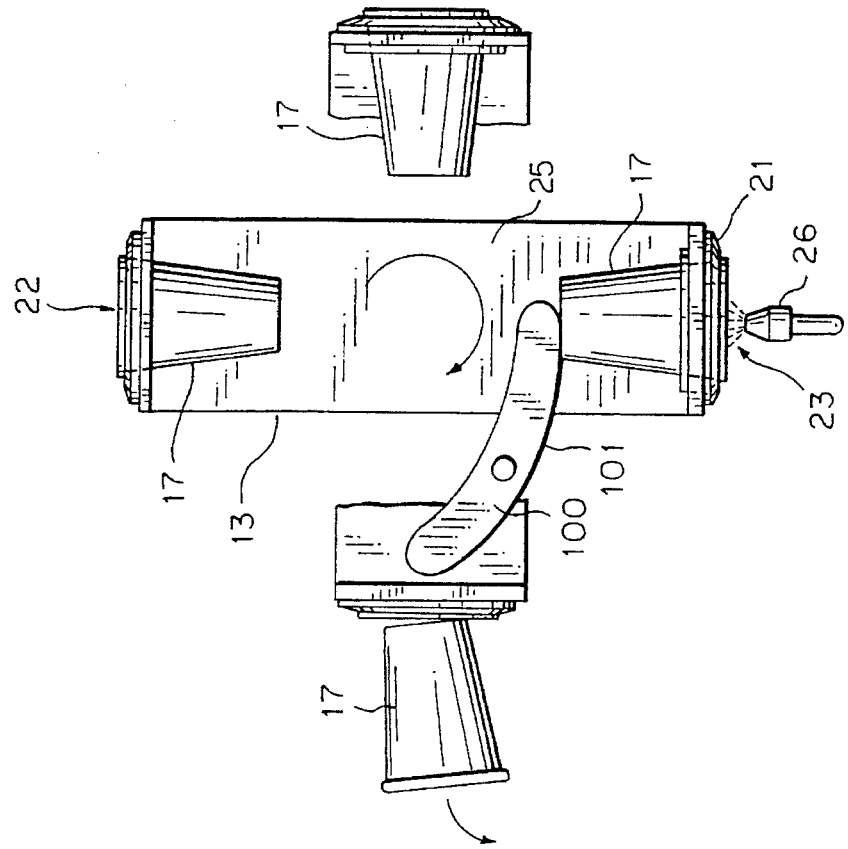

MACHINE FOR COLLECTING USED DISPOSABLE CUPS

BACKGROUND OF THE INVENTION

1. Technical Field of the Invention

This invention is directed to a device for receipt, identification and disposal of used cups.

2. Prior Art

The ever-increasing use of automatic vending machines for hot and cold drinks using disposable cups made in plastic or cardboard or the like, as well as the use of such cups in public places for sale from kiosks, has created the need to consider carefully the question of collection and disposal of such containers after use for either recycling or destruction.

Simply providing waste bins, or one waste bin for each kind of cup, is not sufficient, since the sense of responsibility of the general public cannot be trusted: cups would end up on the floor or even in the wrong bins.

A deposit-type money-back system has been provided to overcome the above problem: on disposing correctly of a cup, a machine dispenses a small payment to a user. Since the principle of a money-back deposit has long been part of the public consciousness, especially as regards drink containers, this system has proved efficacious. Such money-back machines, being dedicated to a specific kind of container, say a cup dispensed by a vending machine situated right next to the money-back machine itself, have to be equipped with means for recognising the type of container a member of the public is trying to insert. Once this has been done, the container is conveyed internally towards a collection bin inside the machine.

The above machines have some drawbacks. Firstly, the lack of correct stacking of the cups means that there is considerable empty space in the bin, so that the bin is quickly filled and has to be emptied frequently, or, obviously, a very large bin has to be provided.

Secondly, if the bin is left for a considerable length of time, the sticky remains of drinks in the cups putrifies and can constitute a health risk.

OBJECT OF THE INVENTION

The present invention aims to obviate the above-described drawbacks, by providing a machine for collecting used cups which is constructionally simple and cheap, and which collects the cups such that the bin can be emptied less frequently than those of the prior art, and which avoids hygiene problems which are usually consequent to leaving cups in bins for a considerable time. A further aim is to provide a machine of the above type which is of relatively small dimensions.

SUMMARY OF THE INVENTION

The above-stated aims and advantages and more besides are all attained by the machine of the invention and which comprises a transport cycle inside the machine connecting an inlet mouth and a collection bin for the cups, which transport cycle comprises one or more operative groups which are crossed by the transiting cups.

BRIEF DESCRIPTION OF THE DRAWINGS

Further characteristics and advantages of the present invention will better emerge from the detailed description that follows, of a preferred but non-exclusive embodiment here illustrated in the form of a non-limiting example in the accompanying drawings, in which:

FIG. 11 is a schematic vertical-elevation frontal view of another embodiment of an operative group, part of the machine of FIG. 1, which effects a cleaning operative on the cups;

FIG. 12 is a schematic right lateral view of FIG. 11;

DESCRIPTION OF THE PREFERRED EMBODIMENTS

Figure 1:
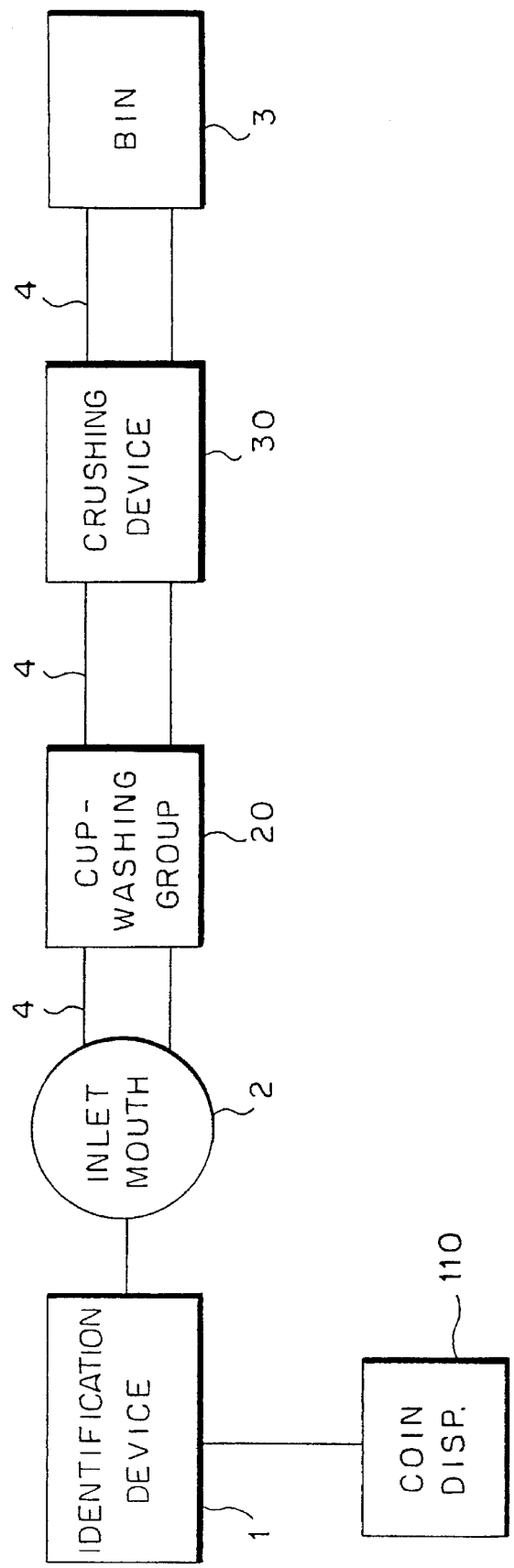
FIG. 1 is a block diagram of a machine according to the invention.

With reference to FIG. 1, 1 denotes an identification device for the type of cup which the machine will accept, which admits a suitable cup through an inlet mouth 2.

The identification device 1 comprises a deposit zone situated on the outside of the machine, where the user leaves the used cup. Inside the machine is a bin 3 for collecting the used cups. A conveyor cycle 4 inside the machine connects the inlet mouth 2 with the bin 3. None of the above is especially characteristic of the machine of the present invention, being common to other like machines.

The machine of the present invention comprises one or more operative groups arranged along the conveyor cycle 4 and crossed by the cups transiting thereon, which operative groups perform operations on the cups before they reach the bin 3.

FIG. 1 shows two such operative groups, 20 and 30, the first of which washes the cups, while the second crushes them.

Figure 2:
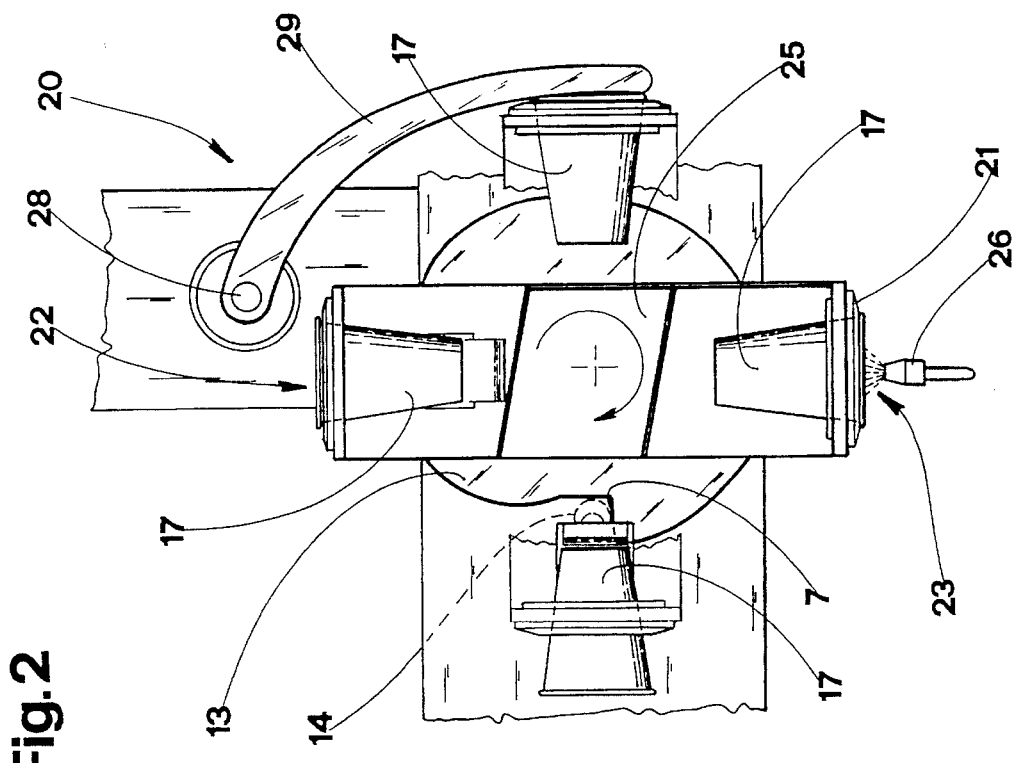
FIG. 2 is a schematic vertical-elevation frontal view of an operative group, part of the machine of FIG. 1, which effects a cleaning operation on the cups.
Figure 3:
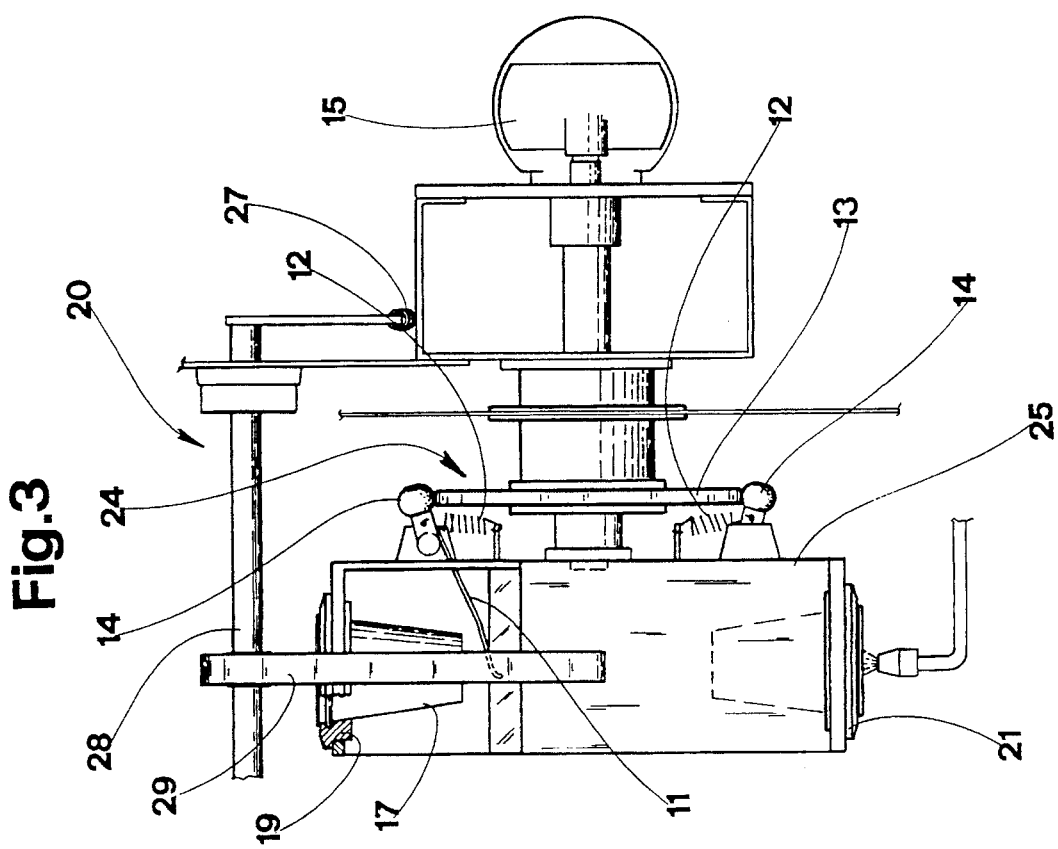
FIG. 3 is a schematic right lateral view of FIG. 2.

FIG. 1 also shows a coin dispenser 110 which combines with the identification device and distributes one or more coins each time the identification device identifies and accepts a coin. As shown in FIGS. 2 and 3, the cup-washing group 20 comprises two sockets 21 for receiving and containing a cup. An upper border 19 of the sockets 21 provides a rest for an upper lip of the cup 17. The sockets 21 are solidly supported on a frame 25 rotating about a horizontal axis, such that the sockets 21 revolve about the same axis with the open ends of the cups facing outwards; the sockets 21 also being arranged in diametrically opposite positions with respect to the axis.

The frame 25 is moved intermittently, so that the sockets 21 halt at a top and a bottom points of their circular trajectory. The top point is situated at a loading station 22, whereat the cup 17 arriving from the inlet is housed in a socket 21. The bottom point of the trajectory coincides with a washing station 23 having a nozzle 26 which sprays a jet of water upwards into the cup 17. The motor 15 for the frame 25 is activated by a known-type sensor (not illustrated), which signals the presence of a cup 17 in the socket 21 at the loading station 22, causing the motor 15 to rotate the frame 25 by half a circle, bringing the socket 21 at the loading station 22 into position at the nozzle 26, and vice versa.

The operative group 20 also comprises means for anchoring the cup 17 in the socket 21, constituted by an arm 29 arranged along the socket 21 trajectory starting from the loading station 22 position, which arm presses against the lip of the cup 17 as it travels down and holds it in position in the socket 21. The arm 29 oscillates about a fixed pivot 28 between a position in which it blocks the cup 17 in the socket 21 and one in which it allows the cup 17 to pass out of the socket 21.

Elastic means 27 act on the arm 29 to bring it towards the cup-blocking position, where the arm 29 contacts the lip of the cup 17 and follows the circular trajectory of the cup 17 on its downward journey from the loading station 22 to the washing station 23. The arm 29 is curved so that its concave surface follows the direction of the cup 17 trajectory.

FIG. 2 shows the operative group 20 at a rest position of the frame 25, where the two sockets 21 are positioned at the two stations 22 and 23. In the same figure, the frame 25 is shown at a position during a rotation where the lip of a cup 17 is sliding along the arm 29.

The operative group 20 further comprises means 24 for expelling the cup 17 from the socket 21, situated at a position after the cup 17 has been washed and before the socket 21 returns to the loading station 22. The means 24 are constituted by a rocker arm 11, solid to the socket 21 during the socket movement, and mobile to the socket 21 from an inactive position where it is below the bottom of a cup 17 situated in a socket 21, to an active position, where it enters the space occupied by a cup 17 in a socket 21. An elastic element 12 is predisposed to act on the rocker arm 11 to keep it in an active position.

A cam 13 is fixed to the machine and arranged by a side of the frame 25. A contact organ 14 solid to the rocker arm 11 interacts with the cam 13 and creates contrast with the elastic element 12, maintaining the rocker arm 11 in an inactive position, at least during the socket 21 journey from the loading station 22 to the washing station 23.

The surface of the cam 13 consists of a first tract shaped like a circumference arc, with its centre on the rotation axis of the frame 25, and a second tract closer to the centre than the previous, and connected to the first tract by a gradual step 7. The step 7 is at a point of the frame 25 trajectory which corresponds with the ejection point of the cup 17 from the socket 21. When the contact organ 14 is contacting with the first tract the rocker arm 11 is in the inactive position. When the contact organ 14 interacts with the step 7, the rocker arm 11 is released and thanks to the elastic element 12 strikes the bottom of the cup 17, thrusting it out of the socket 21.

The functioning design of the operative group 20 causes a cup 17 coming from the inlet of the machine to be placed in a socket 21 situated at the loading station 22, whereupon the sensor signals its presence and the frame 25 is rotated by half a full circle, during which the cup 17 is kept in place in the socket 21 by the arm 29, and is upturned so as to present its dirty internal surfaces to the nozzle 26. The socket 21 which was previously situated below, at the washing station 23, is brought up into position at the loading station 22.

When a further cup 17 has been positioned in the upper socket 21, the motor rotates the frame 25 by half a circle, during which movement the just-washed cup 17 is ejected by the rocker arm 11 and begins its journey towards the second operative group 30.

In a further embodiment, three or more sockets are provided, mounted on a rotating frame and arranged in a star-conformation about the frame axis. The rotation degree of the frame at each stage of the operation is obviously adjusted to suit the number of frame arms.

Figure 10:
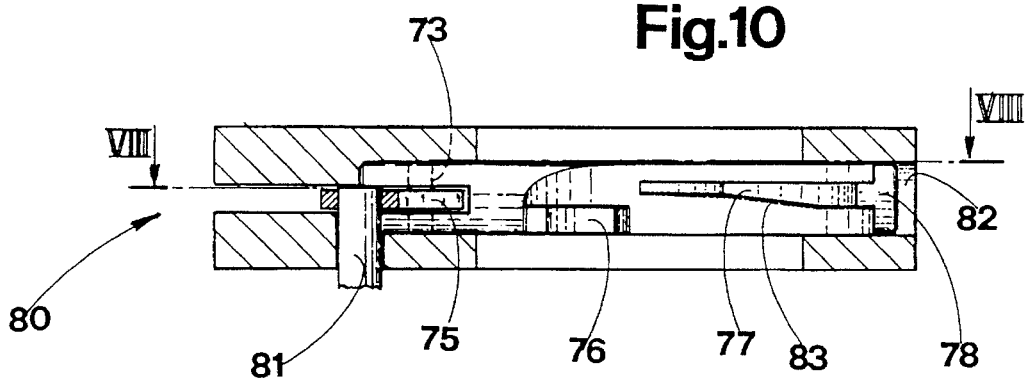
FIG. 10 is a schematic section along line X—X of FIG. 8, with some parts removed to better evidence others.

In a further embodiment of the invention shown in FIGS. 10 and 11, the expulsion means comprise a fixed guide 100 predisposed in the zone comprised between the sockets, which guide interacts with the bottom of a cup located in one of the sockets. The guide exhibits a contact surface with the cup turned towards the outside and which is distanced from the trajectory of the socket 21 by a distance which, in the tract where its contact with the cup begins, is equal to the height of a cup.

The distance of the contact surface of the guide from the socket trajectory gradually diminishes up until the guide 100 is almost tangential to the trajectory. The cup 17, after pausing at the washing station 23, continues rotating solid to the socket 21. At a certain point in the rotation the bottom of the cup 17 contacts the guide 100 and is progressively pushed out of the socket 21 up until exiting completely and beginning its journey towards the operative group 30.

Figure 4:
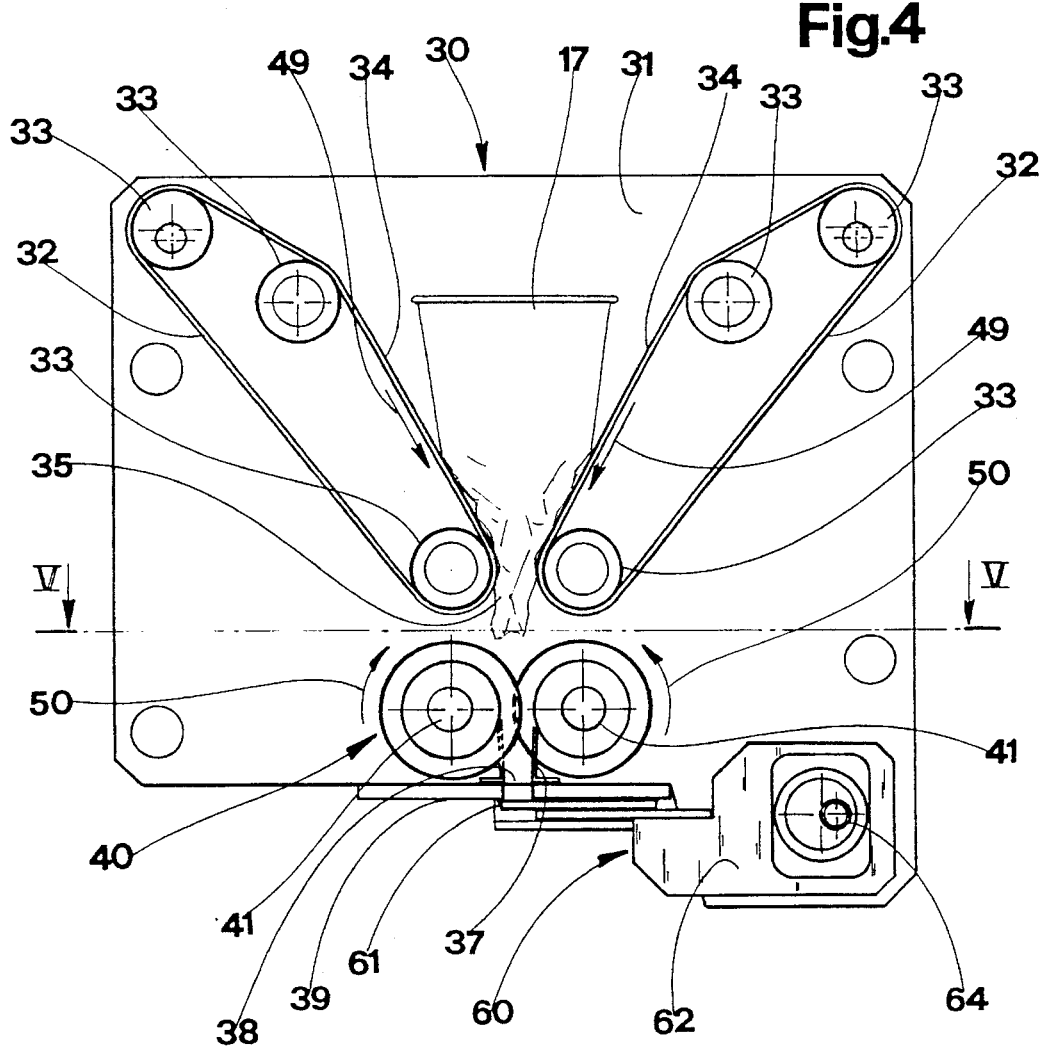
FIG. 4 is a schematic section, in vertical elevation, of an operative group belonging to the machine of FIG. 1, which crushes the cups.
Figure 5:
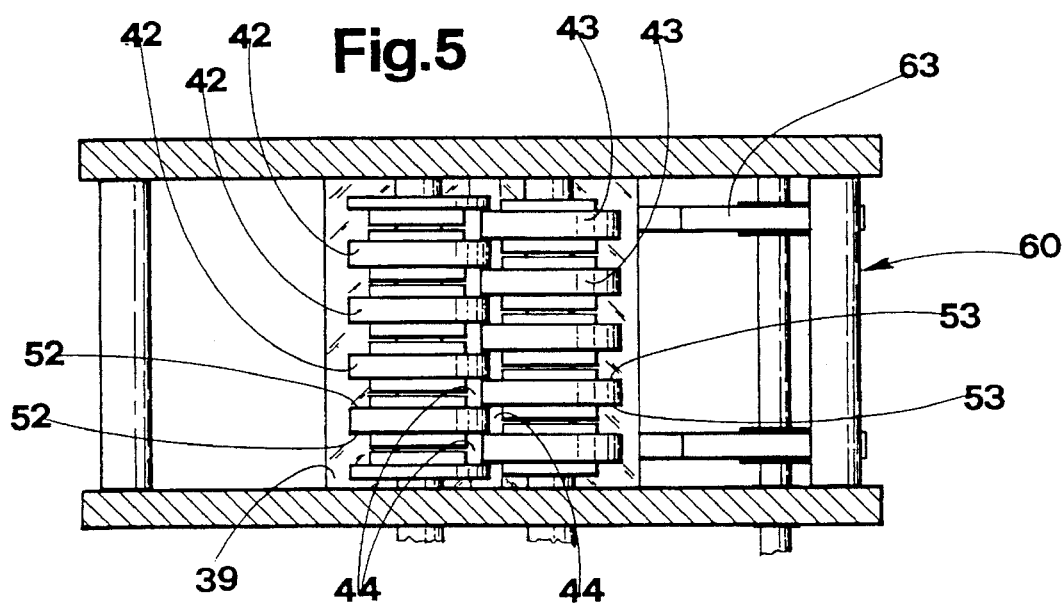
FIG. 5 is a schematic section made along line V—V of FIG. 4.
Figure 7:
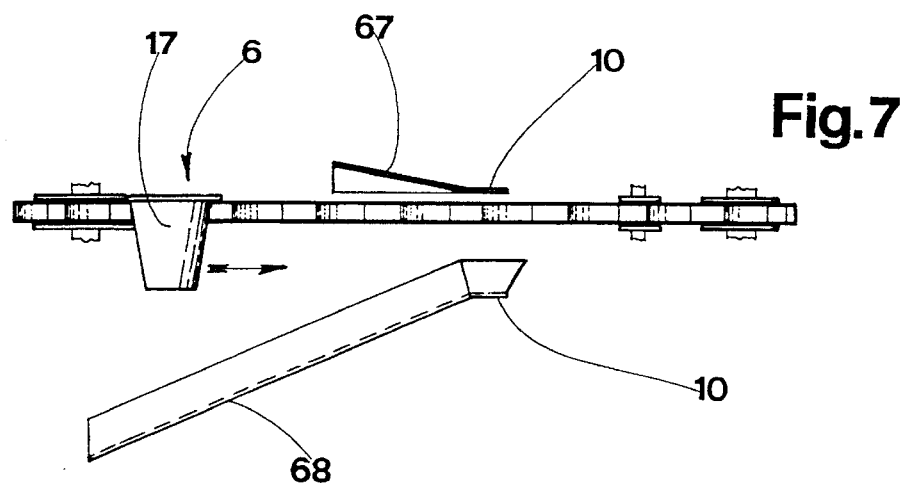
FIG. 7 is a schematic section made according to line VII—VII of FIG. 6.

As shown in FIGS. 4 and 5, the operative group 30 for crushing the cups 17 comprises a loading hopper 31 for the cups on the bottom of which hopper 31 a pressing device for crushing the cups is situated. The pressing device is, in the embodiment shown, constituted by two conveyor belts 32 wound on revolving rollers 33. Each conveyor belt 32 comprises a tract 34 which converges with the other belt 32 to form a v-shape. The two converging tracts 34 move in a downwards direction (see arrows 49) and are powered by rollers 33.

The v-tracts 34 constitute two opposite walls of the hopper 31 and afford at the hopper bottom a narrow opening 35 through which the cups 17, entering the hopper 31 from above, are made to pass through and drop between the rollers 33, between which they are crushed.

A first shredding device 40 is situated at the point where the cup 17 exits from the opening 35 on the bottom of the hopper 31, and shreds a crushed cup 17 into parallel strips. The first shredding device 40 comprises two shafts 41 with parallel axes, rotating in opposite directions as indicated by arrows 50; one of the shafts 41 having a fixed axis and the other a mobile axis pushed by a spring (not illustrated) against the fixed-axis shaft.

A first disc line 42, with the discs specially spaced, is supported coaxially on one of the shafts 41, each disc 42 being equipped with a pair of circular cutting edges 53. A second disc line, equal to the first line, is supported coaxially on the second shaft 41. The discs 42 and 43 are arranged such that apart from the end discs the discs on the first shaft partially insert between two adjacent discs on the second shaft. In this way a plurality of apertures 44 is created between the two shafts, comprising a tract of each shaft and two sides of adjacent discs on one shaft and a facing frontal surface of the disc supported on the other shaft, inserted between the two adjacent discs.

The first shredding device 40 also comprises a plate 39 arranged below the apertures 44 and provided with a passage 38 located on the same vertical plane as the apertures 44. A plurality of banks 37, fixed on the plate 39, connect the longitudinal edge of the passage 38, and in particular the edge constituted by the tract of shaft 41, with the edge of each of the apertures 44.

The crushed cups 17 are conveyed into the zone comprised between the two shafts 41 where they are gripped by the two disc lines 42 and 43, rotating in opposite directions. The cutting edges 52 and 53 shred the cup 17 into a series of strips which, drawn by the discs, pass through the apertures 44 and are directed and channelled by the banks 37 towards the passage 38, below which a second shredding device 60 is arranged, which cuts the strips transversally, forming little squares of cup material.

The second shredding device 60 comprises a blade 61 with a cutting edge transversal to the direction of the strips, which blade is supported by a slide 62 alternating on straight guides 63 normal to the strips. The slide 62 is powered by a rotating camshaft 64.

Figure 13:
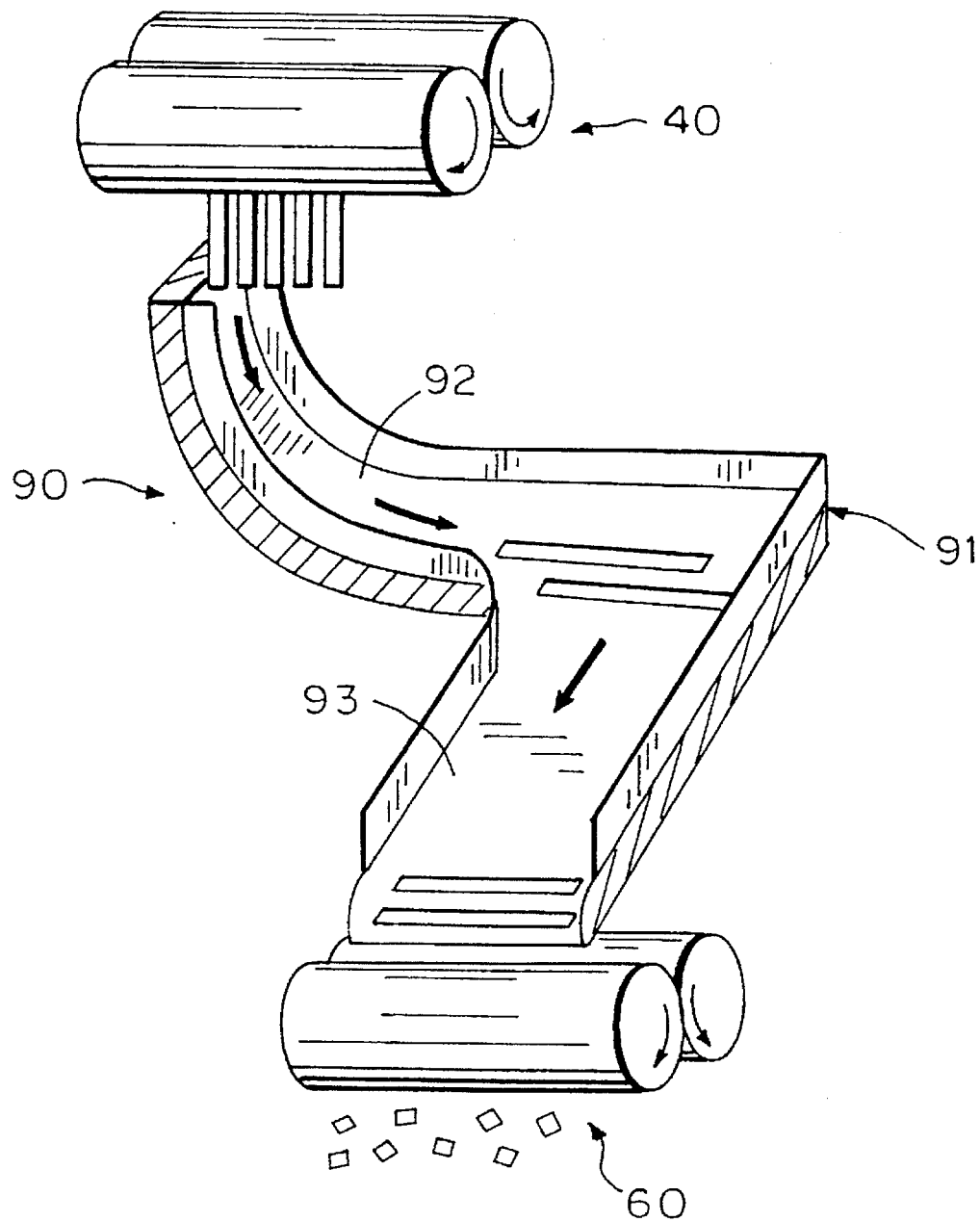
FIG. 13 is a schematic view of a further embodiment of the shredder of the crushing operative group.
Figure 14:
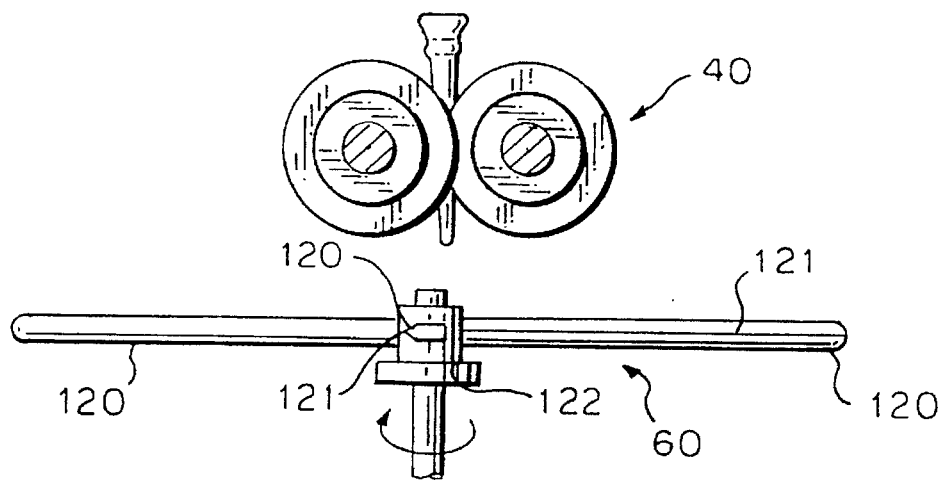
FIG. 14 is a side schematic view of another embodiment of the shredder of the crushing operative group.
Figure 15:
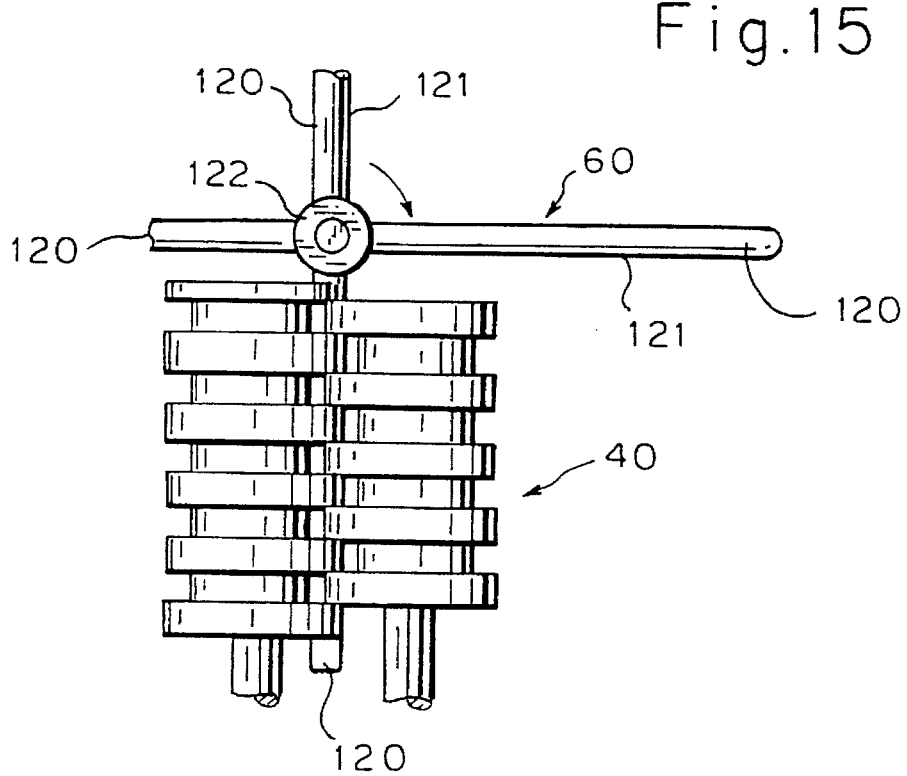
FIG. 15 is a top schematic view of the shredder of FIG. 13.

The operative group 30 further comprises a motor for activating the crushing device and the first and second shredders, which motor is controlled by a known-type sensor (not illustrated), which signals the presence of a cup 17 in the hopper 31. As shown in FIGS. 13 and 14, in a further embodiment the second shredding device 60' comprises a plurality of blades 120 having their cutting edges 121 arranged on a transvere plane to the strips and which are constrained in a spoke-arrangement on a rotating support 122 with an axis which is normal to the said transvere plane. During rotation of the support 122 the blades 120 meet the totality of the strips, one by one as they descend continuously from the first shredding device, and cut them into squares.

In the above second shredding device 60', the descent of the strips is not restrained by the blades, since each blade, after cutting a strip, continues rotating and thus distances from the strip, which continues descending and is further cut by a next blade.

In a further embodiment, the second shredding device 60" comprises a cutting apparatus which, like the first shredding device 40 already described, comprises a plurality of circular cutters placed side-by-side and rotating on two parallel axes, which grip and drag the material to be cut into the central zone. The cutting apparatus is arranged below the passage 38 and has its cutter support axes parallel to the device 40 shafts. As shown in FIG. 12, the second shredding device 60" further comprises a conveyor 90 to receive the strips exiting vertically from the passage 38, and turns them by 90 degrees so as to bring them horizontally and parallel to the axes of the cutter supports of the second shredding device 60, into the central zone where the cut is effected. The conveyor comprises a fixed slide 91 situated below the passage 38 and provided with a first inclined tract 92, by which the strips are tipped and laid horizontally, and a second inclined tract 93, parallel to the rotation axes of the cutters, which terminates in the above-mentioned cutting zone, where the strips are cut into small squares.

In other embodiments, the machine comprises only one or the other of the operative groups 20 and 30.

Figure 6:
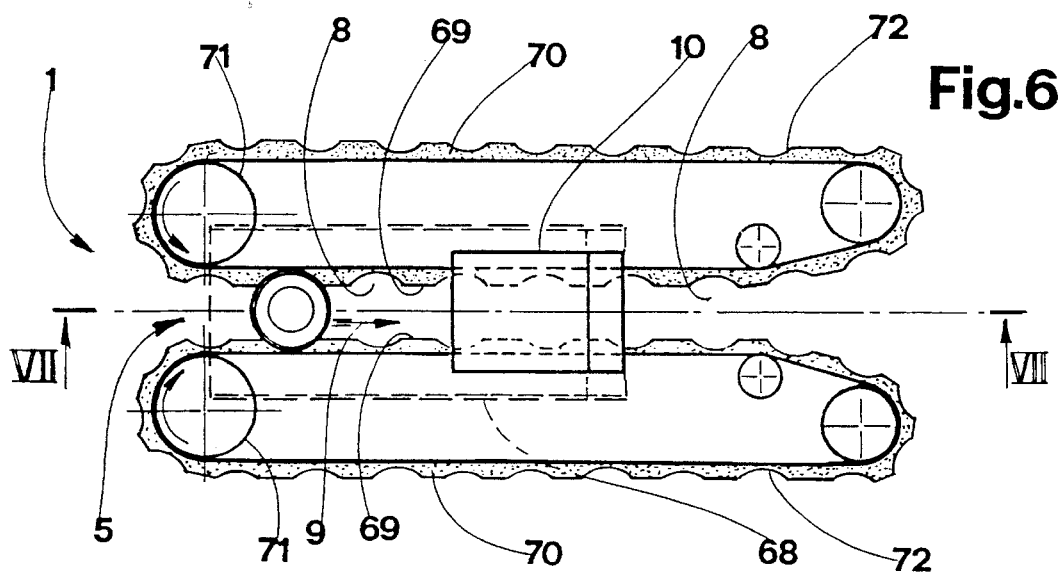
FIG. 6 shows a schematic view from above of an identification device, which is an integral part of the machine of FIG. 1.

As shown in FIG. 6, the identification device 1 identifying the type of cup 17 acceptable by the machine comprises a short flat conveyor tract 5 uniting a release zone 6 of the used cup 17 with the inlet mouth 2.

The conveyor tract 5 comprises a pair of belts 70 lying on the conveyor plane, and wound about wheels 71 having axes normal to the plane. The belts 70 exhibit two straight, parallel and closely-set tracts 69 moving at the same speed in the same advancement direction as the conveyor, denoted by arrow 9. Each belt 70 laterally bears outwardly-facing concave treads 72 with a predetermined circular section.

The treads 72 are arranged on the respective conveyors such that, at the parallel tracts 69, a tread 72 on one of the belts 70 coincides with and faces a tread 72 on the other belt 70, symmetrically according to a vertical median plane of the conveyor tract 5. Thus a succession of calibrated apertures 8 with pre-established diameters are created, which move in the advancement direction and are equipped with an edge on which the lips of the cups can rest.

The conveyor tract 5 also comprises release means, constituted by the belts 70 itself, predisposed on the terminal tract of the conveyor tract 5 itself, which serve to detach the cup 17 resting on its lip on the edge defined by the two treads 72, and sends its towards the inlet mouth 2.

At the terminal tract of the conveyor 5 the two opposite treads 72 diverge as their respective belts 70 approach the winding wheels 71, so that the resting edge for the lip of the cup 17 is removed. Also comprised on the terminal tract of the conveyor 5 are an upper and a lower barrier 10, arranged transversally to the transport direction 9.

The upper barrier 10 is located just above the conveyor plane, while the lower barrier is located below the same conveyor plane, at distances just greater than a height of an acceptable cup. The upper barrier 10 is further equipped with an extension 67 turned in an opposite direction to the advancement direction 9 towards the release zone 6 which the cups 17 are coming from. The extension 67 has one end, the end opposite to the conveyor 5 plane, raised by a predetermined amount and then sloping down to the plane, connecting with the upper barrier 10.

The machine further comprises a distancing device, arranged downstream of the identification device 1, and preventing access of undesired objects through the inlet mouth 2. The distancing device comprises a container of the unacceptable objects, arranged below the conveyor, a slide 68 arranged between the apertures 8 and the underlying container of the unaccepted objects.

The wheels 71 are provided with a motor, which is activated when a used cup is placed at the release zone 6. The cup 17, resting on the edges of two opposite treads 72, is conveyed by the belts 70 in the advancement direction, up until it reaches the terminal part of the conveyor, where the treads 72 separate and release the cup 17, which then enters the machine through the inlet mouth 2. The belts 70 thus stop so that another aperture 8 can locate at the release zone 6.

Should an unacceptable object be place in the release zone 6, the identification device 1 carries it towards the unaccepted-object container. Supposing that the undesired object is smaller than an acceptable cup 17, it falls down through the aperture 8 and is removed by the slide 68. Should the unacceptable object be of a different size to the acceptable cup 17, but still able to rest on the edge of the aperture 8 and thus be transported in the advancement direction 9, it will still not reach the inlet mouth 2 since the barriers 10 will transport it down towards the slide 68. Removal of the undesirable objects which have nonetheless succeeded in being drawn by the conveyor 5 is facilitated by the fact that the belts 70 are provided with a certain flexibility allowing the belts 70 to stretch and enlarge, causing the object to fall when trapped by the barriers 10. The extension 67 of the upper barrier and the slide 68, which is rigidly connected to the lower barrier, contribute to ensuring the object does not carry on in the advancement direction, and cause the belts 70 to spread.

In a further embodiment, not shown in the figures, the machine adopts a known-type coin dispenser in combination with the identification device 1. The dispenser distributes coins or tokens each time the identification device 1 accepts a cup 17. In this way a user receives a deposit-return sum when he or she correctly inserts a cup 17.

Figure 8:
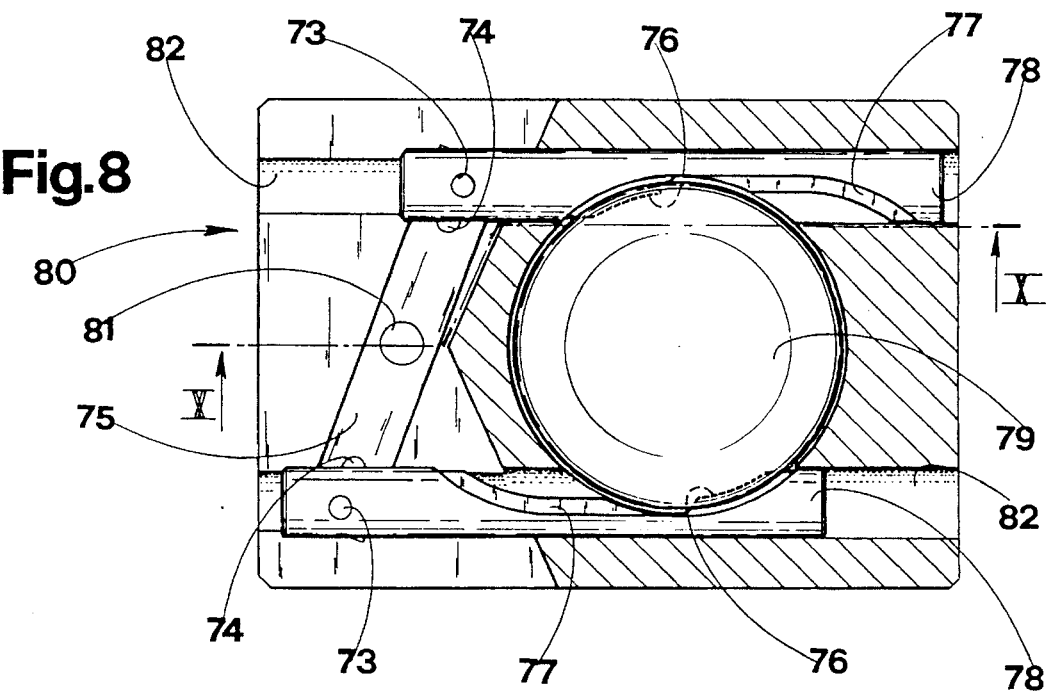
FIG. 8 is a schematic section along line VIII—VIII of FIG. 10 of a cup distributor, part of the machine of the invention, with some parts removed to better evidence others.
Figure 9:
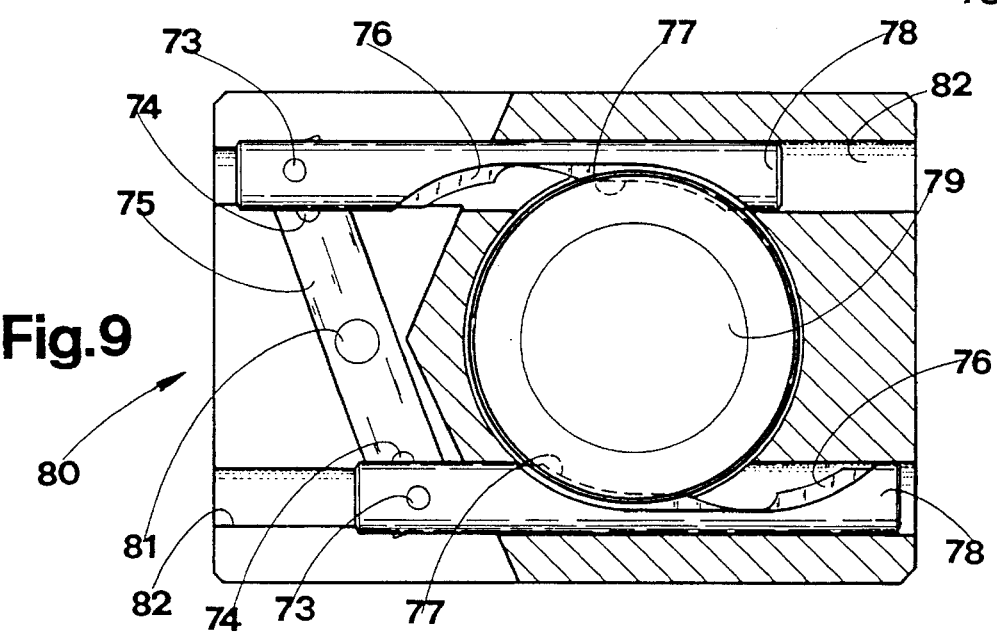
FIG. 9 shows a further embodiment of the cup distributor of FIG. 8.

As shown in FIGS. 8, 9 and 10, a still further embodiment of the machine comprises a cup distributor 80 situated upstream of the operative groups 20 and 30, which receives the selected and accepted cups and stacks them in a magazine 79. The magazine 79 comprises a socket, on which the cups 17 are stacked, and a device to drop the cups into the socket one at a time towards the inlet mouth 2.

The above device comprises two rods 78 slidably coupled to respective straight, horizontal and parallel guides 82, which move alternatingly. The rods 78 are arranged at diametrically opposite sides of the magazine 79 and exhibit a proportion portion frontally facing the base of the stack of cups in the magazine 79. Each rod 78 is equipped, at the longitudinal portion, with two projections, an upper projection 77 and a lower projection 76, having at least one arched tract with a curvature equal to that of a cup 17. The projections 77 and 76 of a rod 78 are symmetrically arranged, with respect to the vertical axis of the magazine 79, to the respective projections of the other rod. The upper projection 77 is inferiorly provided with a slightly downwardly-inclined portion 83. Each pair of projections, 76 or 77, identifies two support planes or zones for the lip of the cup located at the base of the magazine 79. The lower projections 76, or the upper projections 77 constitute the support socket of the cup stack. The support planes defined by the projections 76 and 77 are horizontal and distanced in height one from the other by an equal amount to the distance between the lip of the last cup and the penultimate cup in the magazine 79.

In their alternating movement the rods 78 achieve two extreme positions, in first of which (see FIG. 8) the lower projections 76 locate on the vertical of the lip of a cup in the magazine 79, while the upper projections 77 are outside the vertical, so that the cup at the base of the stack can rest only on the lower projections 76. In the second extreme position (see FIG. 9), the plane identified by the upper projections 77 is on the vertical of the cups, while the plane identified by the lower projections 76 is external.

The projections 77 and 76 of each rod 78 are closely arranged, so that the rod 78, during its movement from one extreme position to another, assumes at least one intermediate position in which both projections 77 and 76, are contemporaneously located on the vertical of the lip of a cup in the magazine 79.

The rods 78 are provided with command means comprising an arm 75 on which ends two slots 74 are made, which are coupled to sliders 73 solidly constrained to the rods 78. The arm 75 oscillates between two positions about a vertical-axis central pivot 81, shown in FIGS. 8 and 9, which correspond to two extreme positions of the rods 78.

A rotation of the pivot 81 causes a simultaneous displacement of both rods 78, from one extreme position to another. If the rods 78 are in the position shown in FIG. 8, where the cup on the bottom of the stack is resting on the lower projections 76, and the pivot 81 is rotated in an anticlockwise direction, the lower projections 76 distance from the magazine 79 while the upper projections 77 insert between the lips of the last and the last-but-one cup up until the last cup is freed by the lower projections 76 and thus falls, helped by the lower portions 83 of the upper projections 77 which push it downwards. The penultimate cup now becomes the last cup, still supported by the upper projections 77 (see FIG. 9). The fallen cup is directed through the inlet mouth 2 towards the operative group 20 downstream of the distributor. A further arm 75 rotation, this time clockwise, resets the configuration of FIG. 8, where the stack is resting on the lower projections 76.

The user waiting for his or her coin or token does not have to wait until the previous cup has been washed, since the identification device 1 and the coin dispenser, thanks to the presence of the magazine situated upstream of the operative groups 20 and 30, can perform an autonomous and independent work cycle which is completed downstream of the magazine.

Numerous modifications can be brought to the invention of a practical-applicational matter, without its foresaking the field of protection sought.

What is claimed:

1. A machine for collecting used cups, comprising:

identification means for identifying a type of cup which the machine will accept;

an inlet mouth for the cups, through which a cup is introduced into the machine;

a bin for the cups, in which the cups introduced into the machine are collected;

a conveyor, internal of the machine, connecting the inlet mouth with the bin;

an operative group for washing the cups, arranged along the conveyor and passed through by cups transiting along the conveyor, said operative group washing the cups before the cups reach the bin, wherein the operative group comprises:

at least one socket for containing cups, being movable on command in a cyclic movement according to pre-established trajectory;

a loading station of a cup in which the cup is housed mouth-upwards on the socket, and a washing station of the cup whereat the cup is turned with the mouth thereof facing downwards, said loading station and said washing station being situated along the trajectory;

means for removing the cup from the socket at a position during a trajectory of the socket situated between the washing station and the loading station;

wherein the first operative station comprises:

a support frame rotating intermittently about a horizontal axis, stopping repeatedly at the loading station, located at an upper position in the socket trajectory, and the washing station, located at a lower position in the socket trajectory; the support frame solidly bearing the socket, which socket exhibits an upper border on which a lip of said cup rests;

at least one nozzle, located at the washing station, which sprays a jet of water in an upwards direction;

means for anchoring said cup to the socket, comprising an arm arranged along the trajectory of the socket between the loading station and the washing station, conformed and arranged such that the lip of the cup in the socket is in contact with the arm during movement of the socket from the loading station to the washing station, and is held in a position between said upper border and said arm.

2. A machine as in claim 1, wherein the arm oscillates about a fixed pivot external to the frame between a position in which the arm obstructs the cup and a position in which the arm allows the cup to pass, said arm being nudged by elastic means towards a position of obstruction; a part of said arm, in the obstruction position, interfering with a circular trajectory described by the lip of the cup when moving from the loading station towards the washing station; said portion of the arm exhibiting a slightly curved profile, a concavity of the curve facing the lip of the cup.

3. A machine as in claim 2, wherein the frame supports two or more said sockets arranged at a same distance one from another about a rotation axis of the frame; said motor being able to command a rotation of the frame equal to an angular distance between two adjacent sockets on receiving a signal from the sensor.

4. A machine as claimed in claim 1, wherein the means for removing a cup comprise a fixed guide predisposed at a position between the washing station and the loading station, being such as to coincide with a bottom of a cup following the socket trajectory; said guide exhibiting a surface of predetermined length which interacts with a bottom of a cup, and which is distanced from the socket trajectory by a distance which gradually varies from a maximum at a commencement of contact with the bottom of a cup to a minimum whereat the guide is almost tangential to the socket trajector.

5. A machine as claimed in claim 1, wherein the means for removing a cup comprise:

- a rocker arm, solid to the socket when the socket moves and mobile with respect to the socket between an inactive position, where the rocker arm is below the bottom of a cup positioned in the socket and an active position, wherein the rocker arm invades a space occupied by the cup positioned in the socket;
- an elastic element predisposed to act on the rocker arm to maintain said arm in the active position,
- a cam, fixed to the support frame, on which a contact organ solid to the rocker arm runs; said cam being shaped such as to bias the elastic element and such as to keep the rocker arm in the inactive position, at least during a journey of the socket from the loading station to the washing station.

6. A machine for collecting used cups, comprising:

- an identification means for identifying a type of cup which the machine will accept;
- an inlet mouth for the cups, through which a cup is introduced into the machine;
- a bin for the cups, in which the cups introduced into the machine are collected;
- a conveyor, internal of the machine, connecting the inlet mouth with the bin;
- an operative group for crushing and shredding the cups, arranged along the conveyor and passed through by cups transiting along the conveyor, said operative group performing action on the cups before the cups reach the bins, said operative group comprising:
- a pressing device for crushing the cups;
- a first shredding device, which receives a crushed cup from the pressing device and cuts it into parallel strips;
- a hopper for loading the cups before they are crushed, on a bottom of which the pressing device is situated;
- wherein the crushing device comprises two conveyor belts a tract of one of which conveyor belts being opposite to a tract of another of said conveyor belts; said tracts being configured such as to converge in a downwards direction, and in an advancement direction of the conveyor belts, together to form a v-shape and to constitute opposite walls of the hopper; an aperture being afforded at the bottom of the v-shape between the tracts of the two conveyor belts through which the cups placed in the hopper are forced to pass, being drawn by the conveyor belts;
- wherein the first shredding device comprises:
- two shafts having parallel axes, rotating in opposite senses, a first of which shafts rotates about a fixed axis and a second of which shafts is pushed by a spring against the first shaft; a first line of discs, supported coaxially by one of the two shafts, which discs are situated side-by-side at a predetermined reciprocal distance,
- each of the discs being equipped with two circular cutting edges;
- a second line of discs, supported coaxially on one of the two shafts, which discs are situated side-by-side such that each disc apart from a disc at each end of the line of discs partially inserts into a space comprised axially between two adjacent discs of the opposite line of discs; a plurality of apertures being presented in a zone comprised between the two shafts, each of said apertures being circumscribed by a tract of a shaft comprises between an adjacent two of said discs, and a front surface of a disc inserted between the adjacent two discs and belonging to an opposite line of discs.

7. A machine as in claim 6, wherein the first shredding device comprises a plate arranged below the apertures and affording a passage located on a same vertical plane as the apertures; a plurality of lateral banks being provided to guide a downwards movement of cut strips of cup material and to channel said strips towards the passage; each of which lateral banks being solid to the plate and connecting a longitudinal edge of the passage, which is parallel to the shafts, with a lip of one of said apertures.

8. A machine as in claim 6, comprising a second shredding device arranged downstream of the first shredding device, which cuts the parallel strips transversely.

9. A machine as in claim 8, wherein the second shredding device comprises a blade having a transversal cutting edge with respect to a longitudinal direction of the strips, the blade being supported on a slide alternating on straight guides perpendicular to the strips.

10. A machine as in claim 9, wherein the slide is powered by a rotating shaft, with transmission passing through a cam.

11. A machine as in claim 8, wherein the second shredding device is arranged below the first shredding device and parallel thereto; a conveyor being provided between the first shredding device and the second shredding device, which conveyor comprises a slide having a first inclined tract to tilt the the strips by 90 degrees, said inclined tract being situated below the first shredding device and being coplanar to the strips, and a second inclined tract, to insert the strips into the second shredding device; said second inclined tract being connected to the first inclined tract and terminating above a zone comprised between the two shafts.

12. A machine as in claim 8, wherein the second shredding device comprises a plurality of blades having a cutting edge arranged on a transversal plane to the strips and being arranged in a radial configuration on a rotating support having an axis which is normal to the transversal plane.

13. A machine for collecting used cups, comprising:

identification means for identifying a type of cup which the machine will accept;

an inlet mouth for the cups, through which a cup is introduced into the machine;

a bin for the cups, in which the cups introduced into the machine are collected;

a conveyor, internal of the machine, connecting the inlet mouth with the bin;

one or more operative groups arranged along the the conveyer and passed through by cups transiting along the conveyer, which one or more operative groups perform actions on the cups before the cups reach the bin;

wherein the identification means comprises:

a tract of conveyer connecting a release zone of a used cup to the inlet mouth for the cup; said release zone exhibiting a plurality of calibrated apertures moving in an advancement direction, a top lip of which apertures supports the lips of the cup; means being provided for releasing the cup from the conveyer from the aperture arranged at a terminal tract of the conveyer at the aperture;

two barriers arranged on the terminal tract of the conveyer transversely to an advancement direction of the conveyer, a first of which barriers is located slightly above the conveyer plane, and a second of which barriers is located below the conveyer plane, a distance between the first and second said barriers being slightly greater than a height of an acceptable cup.

14. A machine as in claim 13, wherein the conveyer comprises two belts, each of which is wound about two vertical-axis wheels, which belts exhibit two parallel straight tracts moving on a horizontal plane in the advancement direction of the conveyer; each of which belts laterally bears a plurality of treads comprising a concavity facing externalwise of the belt; said concavity being of a circular shape and having a predetermined diameter; said treads being arranged such that during the parallel straight tracts they face and exactly coincide with treads on another belt, such that a concavity on one of the belts faces an equal concavity on the other of the belts.

15. A machine as in claim 14, comprising a distancing device preventing passage through the inlet mouth of an object which is differently-shaped to acceptable cups; said distancing device comprising a container for non-accepted objects, situated below the conveyer, and a slide arranged between the apertures and the container.

16. A machine for collecting used cups comprising:

identification means for identifying a type of cup which the machine will accept;

an inlet mouth for the cups, through which a cup is introduced into the machine;

a bin for the cups, in which the cups introduced into the machine are collected;

a conveyor, internal of the machine, connecting the inlet mouth with the bin;

at least two operative groups, arranged along the conveyor and passed through by cups transiting along the conveyor, wherein the first operative group washes the cups before the cups reach the second operative group, and the second operative group crushes and shreds the cups before the cups reach the bin;

a coin dispenser which combines with the identification device and distributes one or more coins each time the identification device identifies and accepts a cup;

a distributor of accepted cups, arranged between the identification device and the inlet mouth, which distributor comprises a magazine wherein the cups are stacked and conveyed towards the inlet mouth one by one.

17. A machine as in claim 16, wherein the distributor comprises two rods, slidable on straight guides, each of which two rods is provided with an upper projection and a lower projection, providing two support planes for the lip of a cup located at a base of the magazine; said planes being distant from each other equal to a distance between the lips of a last cup and a last-but-one cup in a stack in the magazine; said rods being synchronisedly movable on command and alternating between a position whereat only the lower projection of each rod is on a same vertical plane as the lip of a cup in the magazine, and a position whereat only the upper projection of each rod is positioned thereon; at an intermediate position of the two rods, both upper and lower projections of each of the two rods being located on a same vertical plane as the lip of a cup.

18. A machine as in claim 17, wherein the upper and lower projections of one of the two rods are diametrically opposite the upper and lower projections of another of the two rods with respect to a vertical axis of a stack of cups in the magazine; means for commanding the two rods being provided, consisting in an arm having slots coupled to sliders solid to the rods, which arm oscillates about a vertical-axis central pivot between two positions corresponding to said rod extreme positions when commanded by the arm.

19. A machine as in claim 17, wherein the upper projection is inferiorly provided with a portion which is slightly downwards-inclined.

* * * * *